(12) United States Patent
Zaborowski et al.

(10) Patent No.: US 10,699,509 B2
(45) Date of Patent: Jun. 30, 2020

(54) ARRAY OF CARD MECHANISMS

(71) Applicant: ENTRUST DATACARD CORPORATION, Shakopee, MN (US)

(72) Inventors: Alexander K. Zaborowski, Shakopee, MN (US); David E. Wickstrom, Shakopee, MN (US); Patrick C. Cronin, Shakopee, MN (US); Rajesh K. Juriasingani, Chaska, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 86 days.

(21) Appl. No.: 15/616,184

(22) Filed: Jun. 7, 2017

(65) Prior Publication Data

US 2017/0358166 A1 Dec. 14, 2017

Related U.S. Application Data

(60) Provisional application No. 62/347,709, filed on Jun. 9, 2016.

(51) Int. Cl.
*G07F 7/08* (2006.01)
*G07F 19/00* (2006.01)
(Continued)

(52) U.S. Cl.
CPC ............ *G07F 7/0873* (2013.01); *B41J 13/12* (2013.01); *G06K 13/08* (2013.01);
(Continued)

(58) Field of Classification Search
CPC ...... G07F 19/20; G07F 19/205; G07F 7/0873; G06K 13/08; G06Q 20/3555; B41J 13/12;
(Continued)

(56) References Cited

U.S. PATENT DOCUMENTS 5,743,429 A * 4/1998 Morofsky .............. B65H 3/042
221/253
6,098,840 A * 8/2000 Ito ........................... B65H 3/24
221/217
(Continued)

FOREIGN PATENT DOCUMENTS

CN 1438962 A 8/2003
CN 1904908 A 1/2007
(Continued)

OTHER PUBLICATIONS

"Datacard CD820 Card Printer: User Reference Guide" Datacard. pp. 1-19. (Year: 2015).*

(Continued)

*Primary Examiner* — Mark A Deuble
(74) *Attorney, Agent, or Firm* — Hamre, Schumann, Mueller & Larson, P.C.

(57) ABSTRACT

A card mechanism used in an array with other card mechanisms. Each card mechanism handles plastic cards that are to be personalized and provided to end users. The plastic cards can be cards such as financial cards including credit and debit cards, identification cards, driver's licenses, and other plastic cards that are personalized. The card mechanism(s) can supply cards to be personalized in one or more other card mechanisms and/or in a card personalization machine used with the card mechanism(s) in which case the card mechanism(s) is configured as a card input hopper, collect cards that have been personalized in which case the card mechanism is configured as a card output hopper, and/or perform one or more personalization operations on the cards in which case the card mechanism is configured as a card personalization mechanism.

24 Claims, 8 Drawing Sheets

(51) Int. Cl.
*G06Q 20/34* (2012.01)
*B41J 13/12* (2006.01)
*G06K 13/08* (2006.01)
*B65H 3/24* (2006.01)

(52) U.S. Cl.
CPC ......... *G06Q 20/3555* (2013.01); *G07F 19/20* (2013.01); *G07F 19/205* (2013.01); *B65H 3/24* (2013.01)

(58) Field of Classification Search
CPC .... B65H 3/24; B65H 3/56; B65H 2701/1914; B65H 2301/42322; B65H 2404/623
See application file for complete search history.

(56) References Cited

U.S. PATENT DOCUMENTS

| | | | |
|---|---|---|---|
| 6,431,537 | B1 | 8/2002 | Meier |
| 6,957,746 | B2 * | 10/2005 | Martin ................ B65H 1/06 221/131 |
| 7,398,972 | B2 | 7/2008 | Schuller et al. |
| 7,434,728 | B2 * | 10/2008 | Paulson ............... B41J 13/12 235/379 |
| 8,550,294 | B2 | 10/2013 | Martin |
| 8,702,328 | B2 * | 4/2014 | Cronin ................. B41J 13/12 400/601 |
| 2003/0155370 | A1 * | 8/2003 | Martin ................ B65H 1/06 221/123 |
| 2004/0114983 | A1 | 6/2004 | Dawson |
| 2004/0155105 | A1 * | 8/2004 | Nomiyama ....... G06Q 20/1085 235/381 |
| 2006/0175395 | A1 | 8/2006 | Paulson et al. |
| 2008/0106585 | A1 | 5/2008 | Paulson et al. |
| 2010/0001459 | A1 * | 1/2010 | Ohta .................. B65H 1/06 271/145 |
| 2011/0042403 | A1 | 2/2011 | Martin |
| 2011/0217109 | A1 | 9/2011 | Cronin et al. |

FOREIGN PATENT DOCUMENTS

| | | |
|---|---|---|
| CN | 101209628 A | 7/2008 |
| CN | 102834265 A | 12/2012 |

OTHER PUBLICATIONS

International Search Report and Written Opinion of international application No. PCT/US2017/036322, dated Aug. 29, 2017, 16 pages.
Extended European Search Report; European Patent Application No. 17810922.9, dated Jan. 8, 2020 (8 pages).
Office Action, Chinese Patent Application No. 201780042475.9, dated Mar. 23, 2020, with English translation (14 pages).

* cited by examiner

ARRAY OF CARD MECHANISMS

FIELD

The technical disclosure herein relates to a card mechanism that can be used in an array with other card mechanisms for handling plastic cards that are to be personalized and provided to end users. The plastic cards can be cards such as financial cards including credit and debit cards, identification cards, driver's licenses, and other plastic cards that are personalized. The card mechanism(s) can supply cards to be personalized, collect cards that have been personalized, and/or perform one or more personalization operations on the cards.

BACKGROUND

The use of multiple card input hoppers in a card personalization machine is known. For example, the CD800 Card Printer available from Entrust Datacard Corporation of Shakopee, Minn. uses a six-compartment multi-hopper.

SUMMARY

A card mechanism used in an array with other card mechanisms is described. Each card mechanism handles plastic cards that are to be personalized and provided to end users. The plastic cards can be cards such as financial cards including credit and debit cards, identification cards, driver's licenses, and other plastic cards that are personalized.

In one embodiment, the card mechanism(s) can optionally be modular to allow the card mechanisms in the array to be removed and replaced with similar or different card mechanisms, or to allow the number of card mechanisms used in the array to be scaled up or down.

The card mechanism(s) can supply cards to be personalized in one or more other card mechanisms and/or in a card personalization machine used with the card mechanism(s) in which case the card mechanism(s) is configured as a card input hopper, collect cards that have been personalized in which case the card mechanism is configured as a card output hopper, and/or perform one or more personalization operations on the cards in which case the card mechanism is configured as a card personalization mechanism.

In one embodiment, for example where the card mechanism(s) is configured as a card input hopper, each card mechanism can include an integral, built-in mechanical card picker or card discharge mechanism that is actuated by a single external card handling or actuating mechanism to discharge a card from the card mechanism. As a result, when a card mechanism is removed from the array, the mechanical card picker or card discharge mechanism is removed with the card mechanism.

In another embodiment, for example where a plurality of the card mechanism are arranged into an array of rows and columns, the external card handling or actuating mechanism can be configured to pivot about a pivot axis that is perpendicular to longitudinal axes of the card mechanisms as well as move linearly in the direction of the pivot axis in order to access each card mechanism of the array.

In another embodiment, for example where a plurality of the card mechanism are arranged into an array of rows and columns, each card mechanism is removable and replaceable with a different card mechanism including ones having different functions. For example, the array of card mechanisms can include all card mechanisms configured as card input hoppers, card input hoppers and one or more card mechanisms configured to perform one or more card personalization operations, or all card mechanisms configured to perform one or more card personalization operations. In one embodiment, there can be three card input hoppers and three card output hoppers.

In still another embodiment, for example where the card mechanism(s) is configured as a card input hopper or as a card output hopper, a removable security feature can be provided to lock the card mechanism to prevent access to the cards held therein for secure transportation. The removable security feature can take any form for locking the card mechanism. For example, a security tie or zip tie can be removably secured to the card mechanism that locks the card mechanism and prevents operation of the mechanical card picker until the security tie is removed. The removable security may also be a mechanical pad lock or the like. The security feature can have a security identifier on it that uniquely identifies the security feature and accordingly uniquely identifies the card mechanism to which the security feature is secured, and that permits tracking of the card mechanism the security feature is secured to. The security identifier can be any identifier that uniquely identifies the security feature. Examples of security identifiers include, but are not limited to, a unique serial number, a unique 1 dimensional or 2 dimensional bar code, or the like.

In still another embodiment, for example where the card mechanism(s) is configured as a card input hopper or as a card output hopper, the card mechanism can include a memory chip thereon. The memory chip stores data useful for tracking the card mechanism including, but not limited to, one or more security keys and the contents of the card mechanism such as the number of cards. The data on the memory chip can be used for validation or authentication of the card mechanism as well as the contents, such as plastic cards, in the card mechanism. The memory chip can employ public key infrastructure (PKI) security and can store a public and/or private key.

In one embodiment described herein, a card mechanism array can include a plurality of card mechanisms arranged into an array having a plurality of rows and columns. The card mechanisms include at least one card hopper that is configured to contain a plurality of cards in a stack and at least one card personalization mechanism that is configured to perform a card personalization operation on a card. Each card mechanism has an access end and a closed end opposite the access end, with the access end configured to permit a card to exit and/or enter the respective card mechanism through the access end and the closed end configured to prevent a card from exiting or entering the respective card mechanism through the closed end. In addition, the access ends face in a common direction. This permits a single card handling mechanism to access each of the card mechanisms.

In another embodiment described herein, a card hopper array can include a plurality of card feed hoppers arranged into an array having at least one row. Each card feed hopper is configured to contain a plurality of cards in a stack and is configured to discharge the cards individually one-by-one through an access end. The access ends face in a common direction, and each card feed hopper has a longitudinal axis. The longitudinal axes of the card feed hoppers in the array are arranged at an angle to one another so that the longitudinal axes will intersect one another on the access end sides of the plurality of card feed hoppers.

In another embodiment described herein, a card hopper system can include a plurality of card hoppers arranged into an array having at least one row. Each card hopper is configured to contain a plurality of cards in a stack. Each card hopper has an access end through which cards can be individually discharged one-by-one from or inserted one-by-one into the respective card hopper. In addition, the access ends face in a common direction, and each card hopper has a longitudinal axis. A movable card handling mechanism is positioned adjacent to the access ends that is configured to access each individual card hopper via the respective access end. The movable card handling mechanism is pivotable about a pivot axis that is perpendicular to the longitudinal axes, and the movable card handling mechanism is also movable linearly in the direction of the pivot axis.

In another embodiment described herein, a desktop card printer can include a housing with a card input and a card output, a print mechanism within the housing that can perform a printing operation on a card, and either the card mechanism array connected to the housing, the card hopper array connected to the housing, or the card hopper system connected to the housing.

In another embodiment described herein, a card feed hopper can include a housing that is configured to contain a plurality of cards in a stack, with the housing including a longitudinal axis that extends from a first end to a second end. A slot is formed in the housing at the first end that is configured to allow cards to be discharged individually one-by-one from the housing. In addition, the card feed hopper includes a card pick mechanism that is engageable with a single card within the housing to discharge a card through the slot. The card pick mechanism has a first position adjacent to the first end and a second position spaced from the first end. The card pick mechanism is actuatable from the first position to the second position, and the card pick mechanism is configured so that as the card pick mechanism is actuated toward the second position the card pick mechanism discharges a card through the slot.

As used herein, processing, unless otherwise defined in the claims, is intended to encompass performing a processing operation on a card that can involve personalization or not involve personalization. For example, applying a transparent protective laminate, perhaps even including a hologram or other non-personalized security feature, is an example of a card processing operation that does not involve personalization. Applying a name, address, photograph, account number, employee number, signature, programming a chip, reading data from and/or writing data to a magnetic stripe, or the like are examples of processing operations that involve personalization. Therefore, personalization is intended to encompass performing a processing operation on a substrate that involves personalization. The term processing therefore encompasses both personalization and non-personalization operations performed on a card, while the term personalization encompasses personalization operations performed on a card.

In some embodiments, the card mechanisms can be removable from the array which facilitates secure storage of card mechanisms that are configured and used as card input or output hoppers, as well as provides the ability to upgrade and modify the array with different card mechanisms and/or to allow the number of card mechanisms used in the array to be scaled up or down.

DRAWINGS

DETAILED DESCRIPTION

Figure 1:
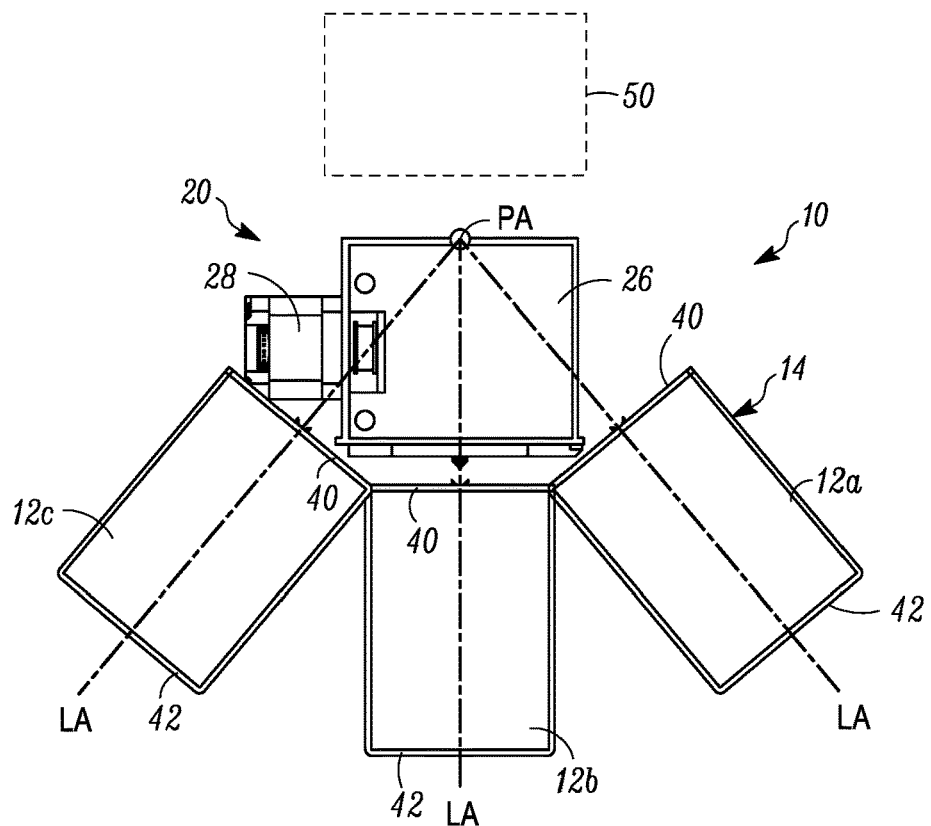
FIG. 1 is a top view of a plurality of card mechanisms described herein arranged into an array and a card handling mechanism in a first position.
Figure 2:
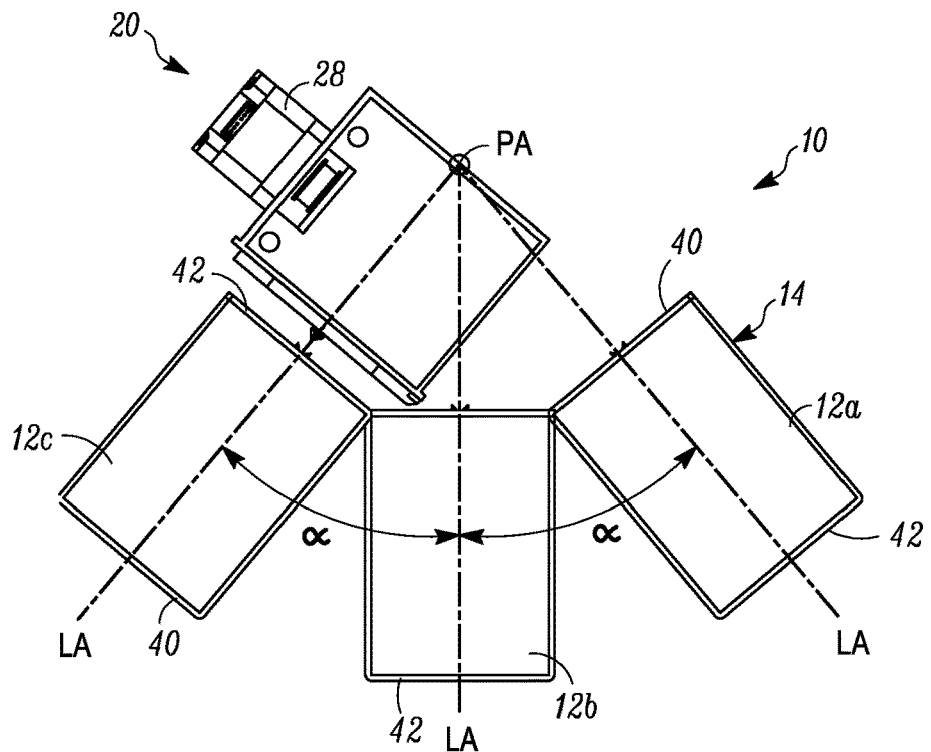
FIG. 2 is a top view similar to FIG. 1 but with the card handling mechanism pivoted to a second position.

Referring to FIGS. 1 and 2, a card mechanism array 10 is illustrated. The array 10 can include a plurality of card mechanisms 12a, 12b, 12c (referred to generally using numeral 12) arranged into at least one horizontal row 14. In the example illustrated in FIGS. 1 and 2, there are three of the card mechanisms 12 in a horizontal row. However, the row 14 can include two or more than three of the mechanisms 12. In addition, referring to FIG. 3, additional ones of the card mechanisms 12 can be arranged in at least a second horizontal row 16 disposed vertically above the row 14. The second row 16 can include the same number of card mechanisms 12 as the row 14, with the card mechanisms 12 in the second row 16 being horizontally and vertically aligned with the card mechanisms 12 in the row 14. The result is that in the embodiment illustrated in FIGS. 1-3, there are two horizontal rows and three vertical columns, with each horizontal row including three of the card mechanisms and each vertical column including two of the card mechanisms. However, the number of rows and columns can vary, and the number of card mechanisms in the rows and columns need not be the same. In addition, the array 10 can include third, fourth, etc. horizontal rows disposed vertically above the rows 14, 16 with each additional horizontal row including one or more of the card mechanisms 12.

The card mechanism(s) 12 can optionally be modular to allow the individual card mechanisms 12 in the array 10 to be removed and replaced with similar or different card mechanisms 12, or to allow the number of card mechanisms 12 used in the array 10 to be scaled up or down.

The card mechanisms in the rows and columns are accessed by a movable card handling mechanism 20. The card handling mechanism 20 is pivotable about a pivot axis PA which in the illustrated example can be vertical. The card handling mechanism 20 is also movable linearly in the direction of the pivot axis PA (or vertically up and down in the example illustrated in FIGS. 1-3) as indicated by the double-headed arrow. The card handling mechanism 20 comprises a carriage 22 that is slidably supported on rods 24 for sliding movement along the length of the rods 24. The rods 24 are fixed on a support structure 26 that is pivotally mounted to pivot about the pivot axis PA. As best seen in FIGS. 1-2, a drive motor 28 is mounted on the support structure 26, with the motor 28 being in driving engagement with the carriage 22 to move the carriage 22 along the pivot axis PA. A motor, for example a stepper motor, can be in suitable driving engagement with the card handling mechanism 20 to pivot the mechanism 20 about the pivot axis PA.

Figure 3:
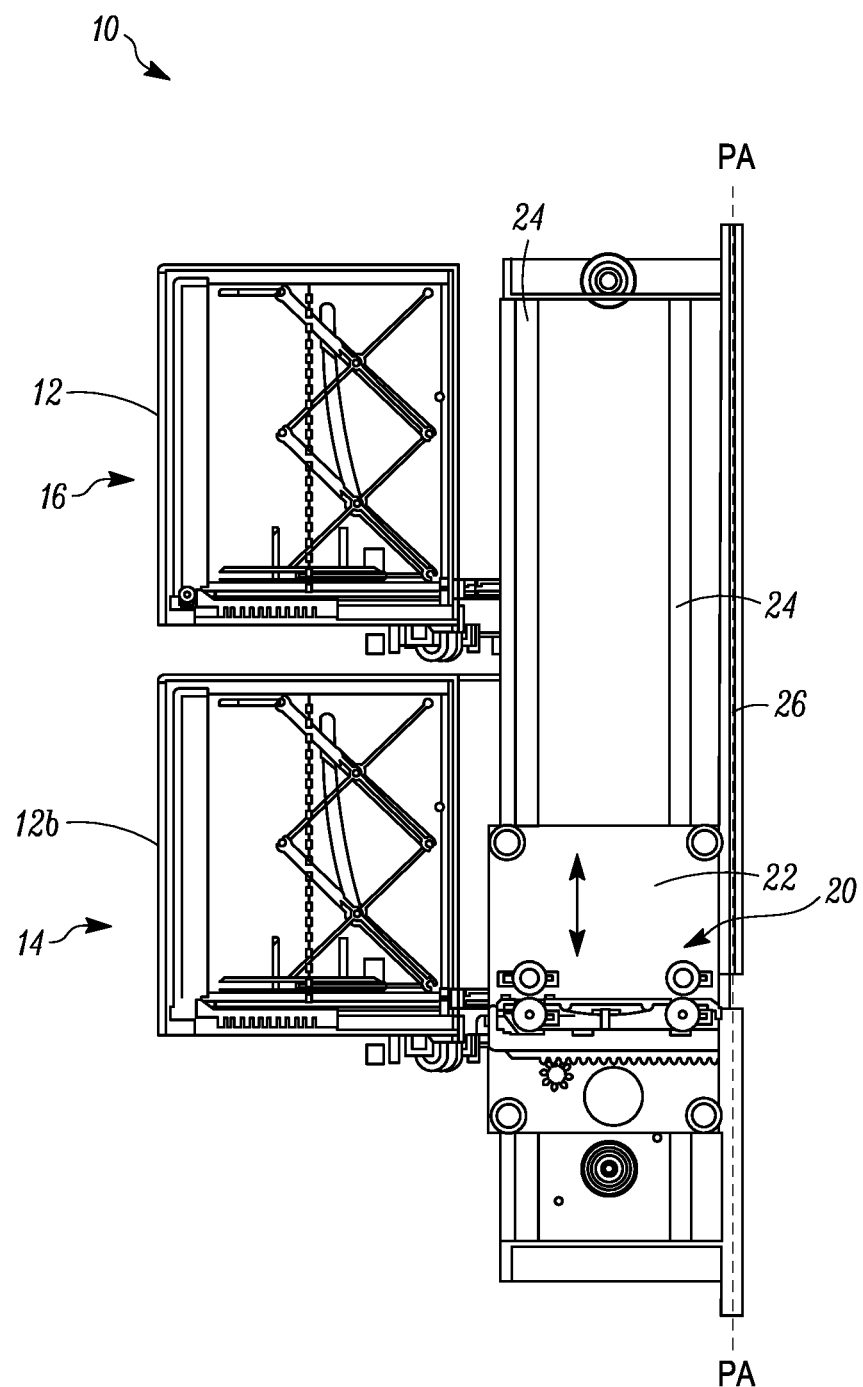
FIG. 3 is a side view of the array of card mechanisms described herein with the card handling mechanism in a lowermost position.

Still referring to FIGS. 1-3, each card mechanism 12 has an access end 40 and a closed end 42 opposite the access end, with the access end 40 configured to permit a card to exit and/or enter the respective card mechanism 12 through the access end 40. The closed end 42 is configured to prevent a card from exiting or entering the respective card mechanism 12 through the closed end 42. As illustrated in FIGS. 1-3, the access ends 40 each face in a common direction toward the card handling mechanism 20 or toward the pivot axis PA. This permits the single card handling mechanism 20 to access the access end 40 of each of the card mechanisms 12.

In addition, each card mechanism 12 has a longitudinal axis LA indicated by dashed lines in FIGS. 1-2. In each horizontal row 14, 16, the card mechanisms 12 are oriented such that the longitudinal axes LA are disposed at an angle α to one another so that the axes LA intersect one another on the access end 40 sides of the card mechanisms 12. For example, in the illustrated embodiment, the longitudinal axes LA in each horizontal row 14, 16 are illustrated as intersecting one another at the pivot axis PA. The angles α between the longitudinal axes LA of the card mechanisms 12 in each horizontal row can be the same. In other embodiments, the angles α may differ from one another, both within a horizontal row and/or differ between the vertical levels. As a result, with the arrangement in FIGS. 1-3, the pivot axis PA is perpendicular to the longitudinal axes LA.

The array 10, including the card mechanisms 12 and the card handling mechanism 20, can be used by themselves to handle and process cards. Alternatively, as shown in FIG. 1, the array 10 can be used with a card personalization system 50. The array 10 can be mounted adjacent to or on the card personalization system 50 to feed cards into and/or accept cards from the card personalization system 50. The card personalization system 50 can be any system suitable for personalizing and/or otherwise processing cards. In one embodiment, the system 50 would include at least a housing with a card input and a card output, and a print mechanism within the housing that can perform a printing operation on a card. The system 50 can also be an embosser, laminator, printer, chip programming unit, a magnetic stripe reading and/or writing unit, or a unit having various combinations of these processing capabilities. In some embodiments, an interface plate can be used to couple the array 10 to the system 50.

In one embodiment, the system 50 can be designed for relatively small scale, individual card personalization and processing where typically a single document to be personalized is input into a processing machine, which typically includes one or two personalization/processing capabilities, such as printing and laminating. These processing machines are often termed desktop processing machines because they have a relatively small footprint intended to permit the processing machine to reside on a desktop. Many examples of desktop processing machines are known, such as the SD or CD family of desktop card printers available from Entrust Datacard Corporation of Shakopee, Minn. Other examples of desktop processing machines are disclosed in U.S. Pat. Nos. 7,434,728 and 7,398,972, each of which is incorporated herein by reference in its entirety.

Figure 9:
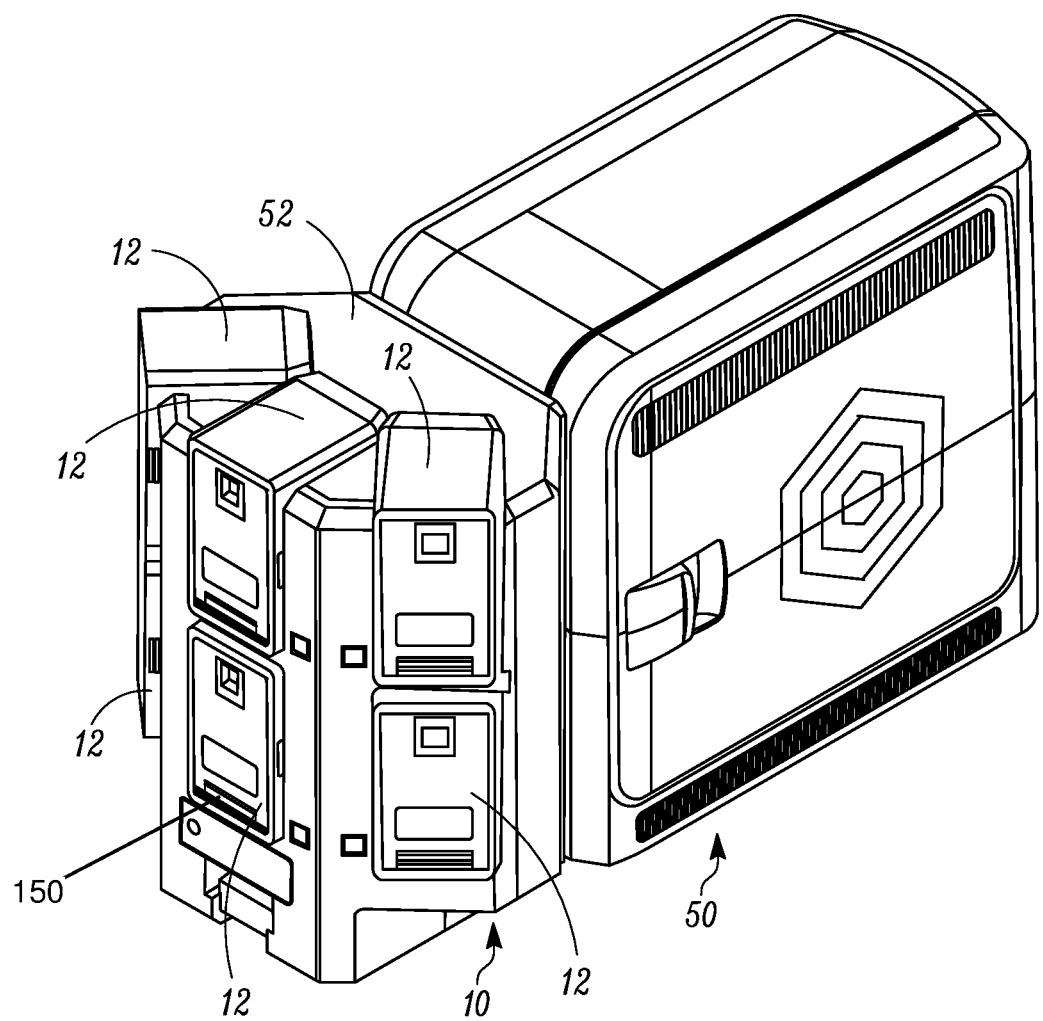
FIG. 9 is a perspective view of the array of card mechanisms described herein together with a card personalization system.

FIG. 9 illustrates the array 10 mounted together with a card personalization system 50 in the form of a desktop processing machine. In the example illustrated in FIG. 9, the card mechanisms 12 are arrayed as described in FIGS. 1-3 into a plurality of horizontal rows and vertical columns. The card handling mechanism 20 is not visible in FIG. 9 since it is enclosed within a housing 52. The card mechanisms 12 are partially contained with the housing 52, and the housing 52 abuts against, and is optionally fixed to, the front end of the card personalization system 50.

Returning to FIGS. 1-3, when the array 10 is used as a standalone system, the card handling mechanism 20 can also include a controller, including a microprocessor, disposed thereon or otherwise associated therewith that controls operation of the movable card handling mechanism 20. When the array 10 is used with the card personalization system 50, operation of the card handling mechanism 20 can be controlled via a suitable controller of the system 50.

Details of the card mechanisms 12 will now be described with various references to FIGS. 4-8. The card mechanisms 12 are configured to: store a plurality of cards waiting to be processed (in which case the card mechanisms 12 can also be referred to as card storage or card feed or card input hoppers); store a plurality of cards after the cards have processed (in which case the card mechanisms 12 can also be referred to as card storage or card output hoppers); process one or more cards that are input into the card mechanism 12 and after processing discharge the processed card; and any combinations thereof. So one or more, or all, of the card mechanisms 12 in the array 10 can be card feed hoppers. One or more, or all, of the card mechanisms 12 in the array 10 can be card output hoppers. One or more, or all, of the card mechanisms 12 in the array 10 can be configured to process cards that are input into and from the card mechanisms 12. In one specific non-limiting embodiment, there can be three card feed hoppers and three card output hoppers. In one embodiment, a card feed hopper that is empty after having discharged all of its cards can then be utilized as a card output hopper that stores processed cards.

To help explain the inventive concepts, the card mechanisms 12 will each be described as being card feed hoppers in one non-limiting example. In such a case, the card mechanisms 12 are substantially identical in construction to one another. However, the construction of some of the card mechanisms may vary depending upon their intended functions.

Figure 4:
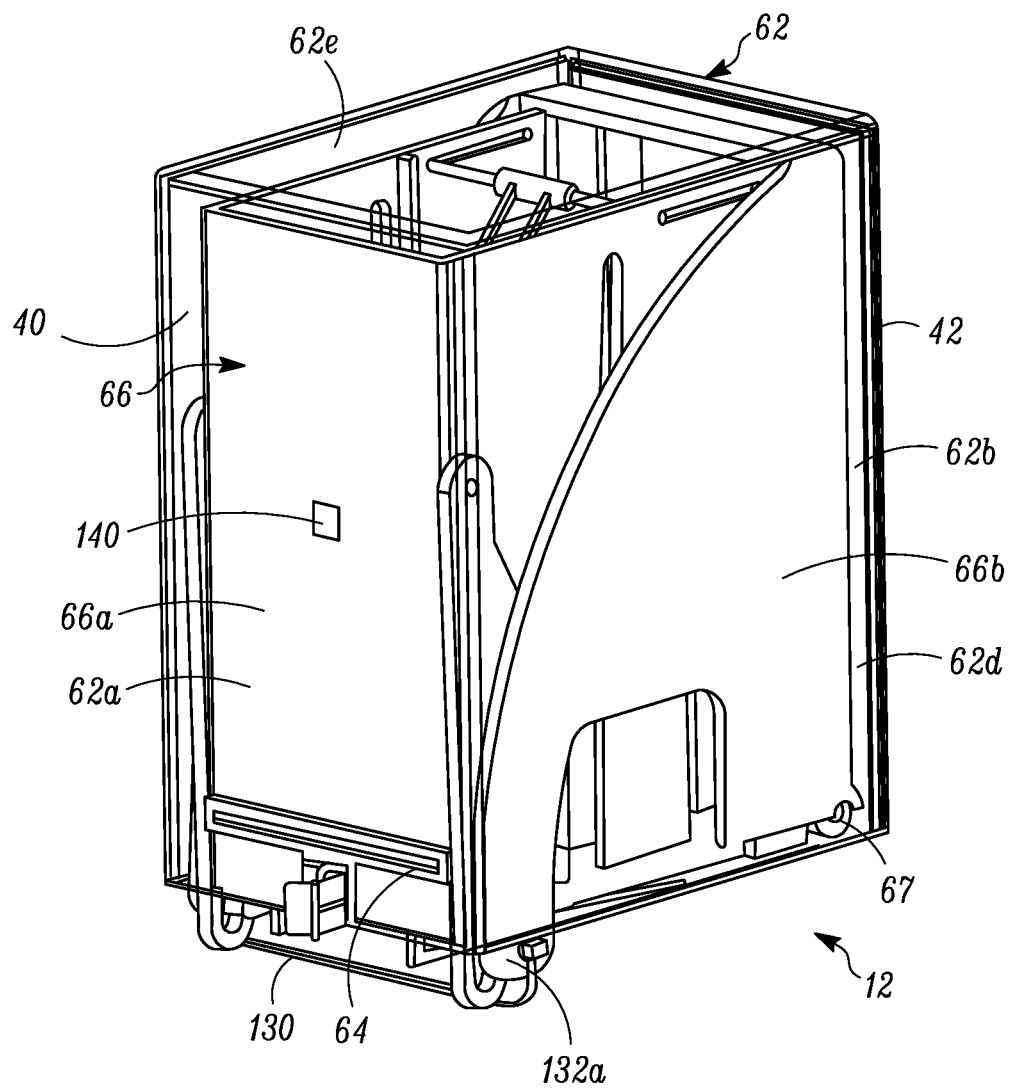
FIG. 4 is a perspective view of one of the card mechanisms with certain portions made transparent to allow viewing of internal structure.
Figure 5:
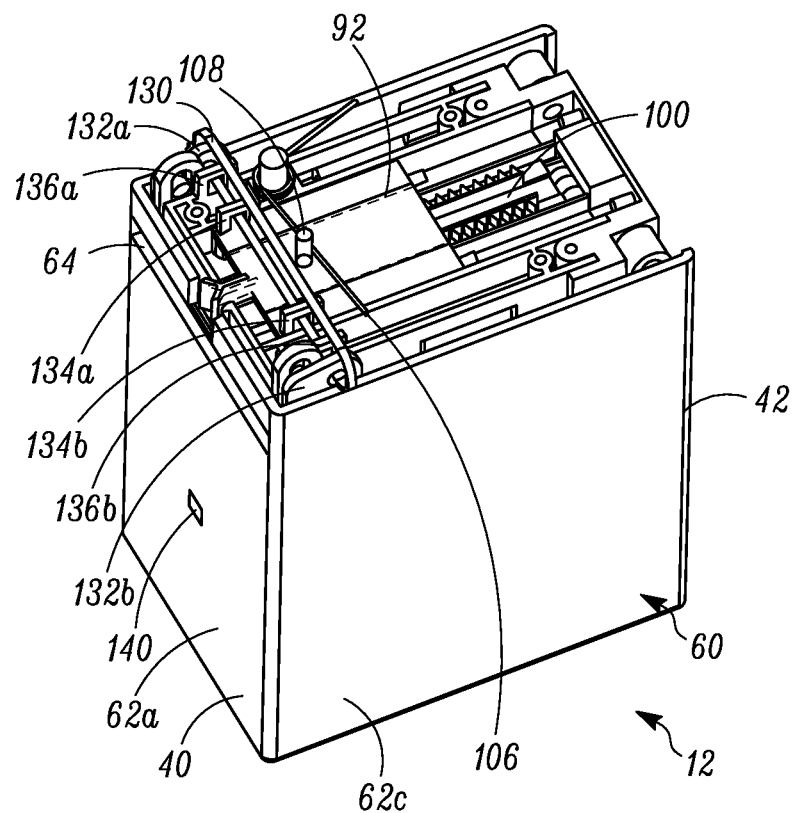
FIG. 5 is a bottom perspective view of the card mechanism of FIG. 4.
Figure 7:
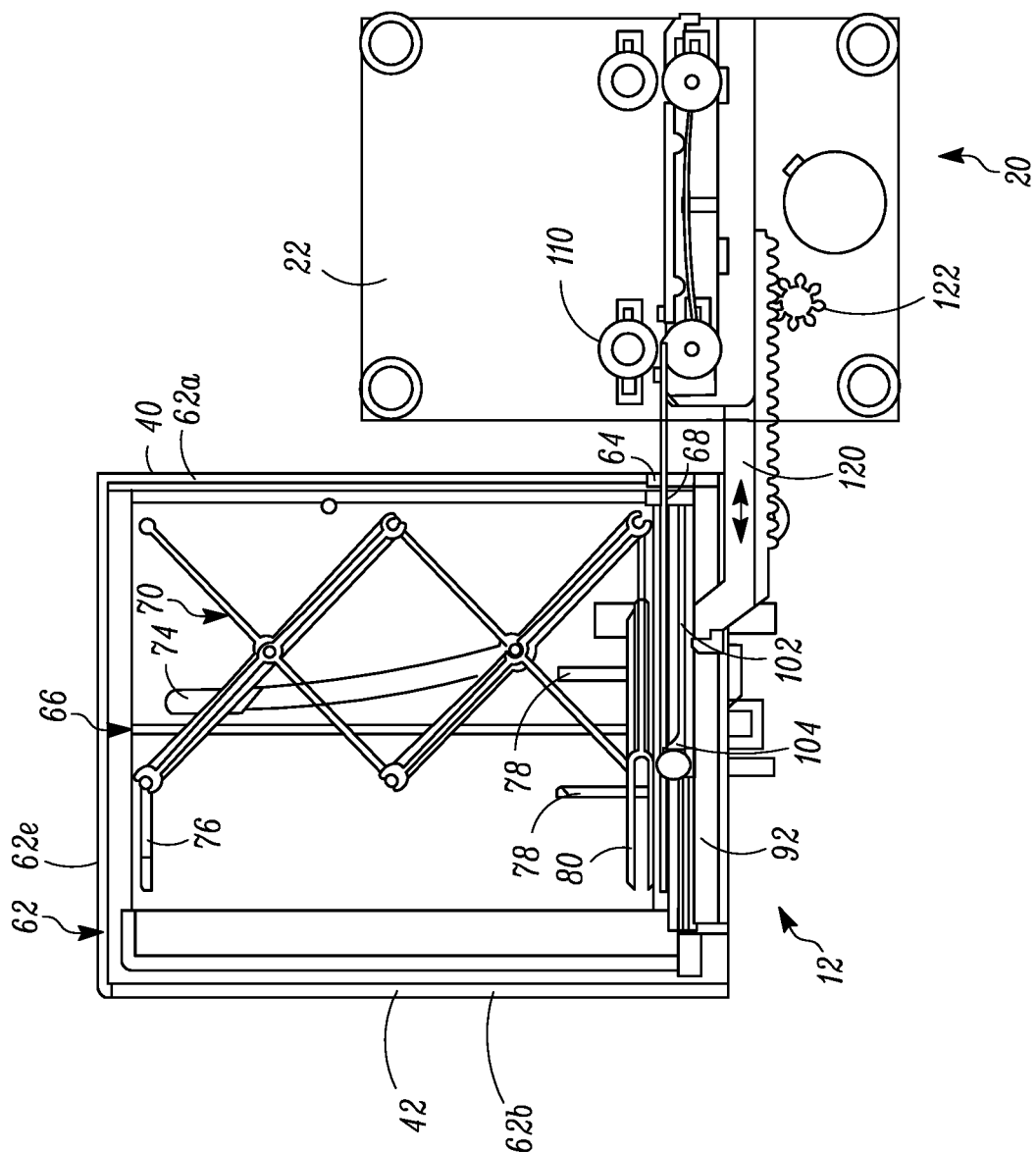
FIG. 7 is a side sectional view of the card mechanism and the card handling mechanism illustrating interaction between the card mechanism and the card handling mechanism.

Referring to FIGS. 4-5 and 7, when configured as card feed hoppers, each of the mechanisms 12 includes a housing 60 that is configured to contain a plurality of cards in a stack (not shown) therein. The housing 60 is designed with security features to prevent unauthorized access to cards within the housing 60 prior to use, for example during transportation of the housing 60.

The housing 60 defines the access end 40 and the closed end 42. As best seen in FIG. 4, the housing 60 is generally rectangular in construction and includes a box-like outer shell 62 with front and back walls 62a, 62b, side walls 62c, 62d, and a top wall 62e. The outer shell 62 is open at its bottom. A slot 64 is formed in the front wall 62a of the outer shell 62 that allows cards to be discharged individually one-by-one from the housing 60.

The housing 60 further includes a box-like inner shell 66 over which the outer shell 62 is arranged. The inner shell 66 receives the stack of cards with the cards laid flat on top of one another. The inner shell 66 includes a substantially closed bottom, a front wall that faces the front wall 62a, a back wall that faces the back wall 62b, a side wall that faces the side wall 62c, and a side wall that faces the side wall 62d. The inner shell 66 is open at its top, with the open top being closed by the top wall 62e. The front wall of the inner shell 66 also includes a slot 68 that is aligned with the slot 64 in the front wall 62a to allow discharge of individual cards.

Referring to FIG. 7, within the inner shell 66 is a card biasing mechanism 70 that is configured to engage the top of the card stack and bias the cards in the stack downward toward the bottom of the housing 60. The card biasing mechanism 70 can have any configuration suitable for applying a downward biasing force to the card stack. In the illustrated example, the card biasing mechanism 70 comprises a plurality of links 72 connected together in an accordion-like fashion with portions of the links supported by slots 74, 76, 78 in the opposing side walls of the inner shell 66, and a bottom plate 80 connected to the base of the links 72 and engageable with the top of the card stack. In operation, the plate 80 is movable upwardly a distance limited by the slots 78 when cards are arranged in a stack. A biasing element, for example a spring (not shown), biases the plate 80 downward.

Referring to FIG. 4, in the illustrated embodiment, the inner shell 66 is formed by a first, front shell piece 66a and a second, rear shell piece 66b. The shell piece 66b is pivotally connected to the shell piece 66a at a pivot 67. In the position shown in FIG. 4, the shell piece 66b is at a closed position at which it closes the rear side of the shell piece 66a preventing removal or insertion of cards into the housing 60. When the outer shell 62 is removed, the shell piece 66b can be pivoted about the pivot 67 to an open position (not shown) where the shell piece 66b no longer closes the rear side of the shell piece 66a to allow removal or insertion of cards.

Referring to FIGS. 5-8, the mechanism 12 includes a card pick mechanism 90 at the base thereof that is engageable with a single card within the housing 60 to pick the bottom card from the stack and discharge the card through the slots 64, 68. In addition, operation of the card pick mechanism 90 is actuated externally by the card handling mechanism 20. The card pick mechanism 90 can have any configuration for achieving these functions. In addition, the card pick mechanism 90 is integrated with the mechanism 12 so that if the mechanism 12 is removed from the array 10, the card pick mechanism 90 goes with the mechanism 12.

In the example illustrated in FIGS. 5-8, the card pick mechanism 90 is a forward-reverse mechanism with a first part 92 that is actuatable in a first direction toward the closed end 42. As the first part 92 is moving toward the closed end 42, a second part 94 is simultaneously actuated by the first part 9 to move in the opposite direction toward the access end 42. The first part 92 includes opposing racks 96a, 96b each with gear teeth that drive pinions 98 as the first part 92 moves in the first direction. The pinions 98 are engaged with a toothed rack 100 that is fixed to a bottom of the second part 94. Referring to FIG. 7, the second part 94 further includes a plate 102 having an angled shoulder 104 formed at the rear thereof that forms the mechanism to pick and push a card from the housing 60.

In operation, the first part 92 of the card pick mechanism 90 has a first position (seen in FIGS. 5 and 6) adjacent to the access end 40, and the first part 92 can be actuated rearwardly toward a second position (shown in FIG. 7) spaced from the access end 40. A biasing mechanism 106, such as a spring (seen in FIG. 5), engages with a pin 108 on the first part 92 to bias the first part 92 to the first position. As the first part 92 is actuated from the first position toward the second position, the second part 94 is actuated forwardly. When the second part 94 moves forwardly, the shoulder 104 engages the bottom card of the stack and pushes the card forwardly. As the second part 94 continues to move forwardly, the leading edge of the card is pushed through the slots 64, 68. The card can then be engaged by a drive mechanism 110 (seen in FIG. 7), such as drive rollers, on the carriage 22 to finish pulling the card from the mechanism 12. Once the card is sufficiently driven from the mechanism 12, the biasing mechanism 106 then returns the first part 92 and the second part 94 to their initial home positions.

Figure 6:
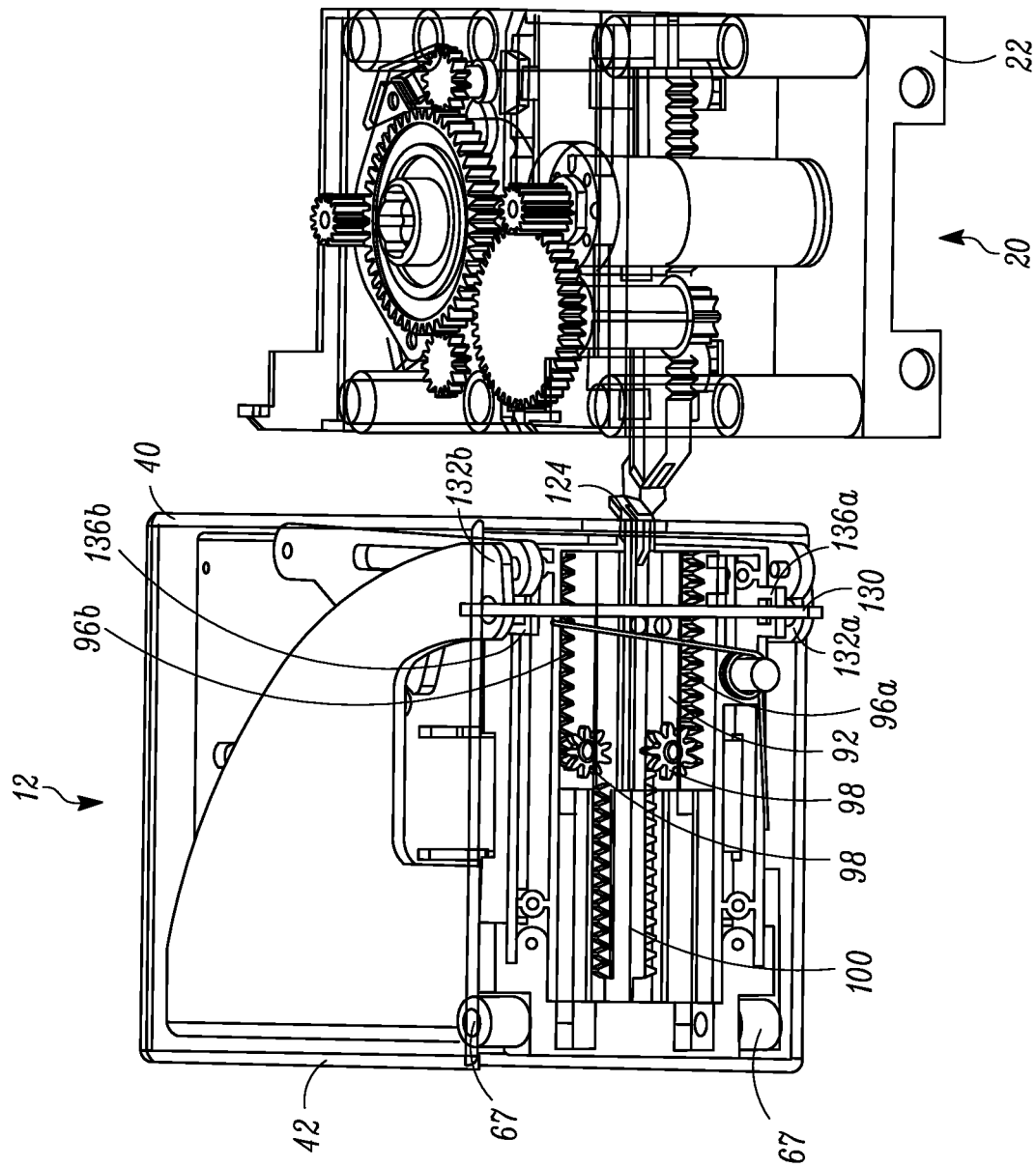
FIG. 6 is a bottom perspective view illustrating interaction between the card mechanism and the card handling mechanism with certain portions made transparent to allow viewing of internal structure.
Figure 8:
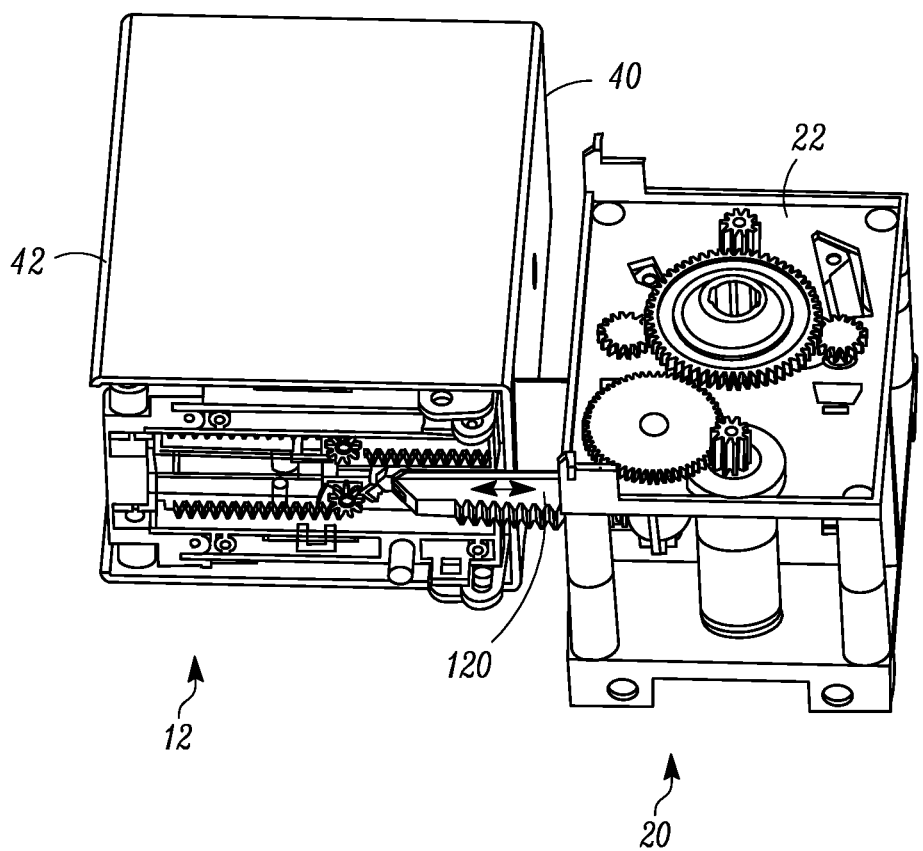
FIG. 8 is a bottom perspective of the card mechanism and the card handling mechanism showing a card being discharged from the card mechanism.

As indicated above, the card pick mechanism 90 is actuated externally by the card handling mechanism 20. In particular, as best seen in FIGS. 6-8, the carriage 22 can include an actuating rack 120. The rack 120 includes teeth that are engaged with a drive pinion 122 that can be driven in forward and reverse directions. The rack 120 can be driven by the pinion 122 toward and away from the mechanism 12. As the rack 120 is driven toward the mechanism 12, the front end of the rack engages with a receiving element 124 of the first part 92 to drive the first part 92 rearwardly to discharge a card from the mechanism 12. After a card has been discharged, the rack 120 is then driven in the opposite direction by the pinion 122 to allow the first part 92 to return to its home position and initiate a new card pick cycle.

In some embodiments, an exception slot 150 (best seen in FIG. 9) can be formed through the closed end 42 of one or more of the card mechanisms 12, formed in the housing 52, or formed elsewhere on the card personalization system 50. The exception slot 150 permits individual cards to be fed one-by-one into the card personalization system. When the exception slot 150 is formed in one of the card mechanisms 12, the exception slot 150 can extend through the back wall 62b of the housing 60 to permit an individual card (or exception card) to be fed into the card mechanism 12 for subsequent processing. The exception card can then be fed by the card pick mechanism 90 from the card mechanism 12 (or from the exception slot in the housing 52 or other location) into the card personalization system 50 or into another one of the card mechanisms 12 for processing.

As indicated above, the housing 60 is provided with security features to prevent unauthorized access to cards within the housing 60 prior to use, for example during transportation of the housing 60. The security features discussed below can be used individually, together or in any combination. Referring first to FIGS. 4-6, a removable security tie 130 (or other removable security feature such as a mechanical pad lock) can be removably secured to the housing 60 that prevents opening of the rear shell piece 66b and prevents movement of the card pick mechanism 90 until the removable security tie 130 is removed. A pair of flanges 132a, 132b are formed on the shell piece 66b that project below the bottom edge of the outer shell 62 as shown in FIGS. 4-6. Each flange 132a-b includes a hole through which the tie 130 can extend. In addition, the first part 92 of the card pick mechanism 90 includes a pair of flanges 134a, 134b that project downwardly therefrom, and the front shell piece 66a includes a pair of flanges 136a, 136b that project downwardly therefrom. The flanges 134a-b and 136a-b each includes a hole through which the tie 130 can extend. As seen in FIGS. 4-6, the tie 130 extends through the flanges 132a-b, 134a-b, 136a-b which prevents opening of the rear shell piece 66b and also prevents movement of the first part 92 of the card pick mechanism 90. Just prior to use and installation of the mechanism 12, the tie 130 can be severed using a suitable cutting device such as a scissors and then removed.

The security tie 130 or other security feature can have a security identifier on it that uniquely identifies the security feature and accordingly uniquely identifies the card mechanism 12 to which the security tie 130 is secured, and that permits tracking of the card mechanism 12 the security tie is secured to. The security identifier can be any identifier that uniquely identifies the security tie 130. Examples of security identifiers include, but are not limited to, a unique serial number, a unique 1 dimensional or 2 dimensional bar code, or the like.

Referring to FIGS. 4 and 5, another security feature is that the housing 60 can have a memory chip 140 (also referred to as an RFID chip) and/or a crypto chip/processor on the housing 60. The chip 140 can store data that is used for validating or authenticating the housing 60 and/or the contents (in this case cards) of the housing 60. Data that can be stored includes, but is not limited to, a unique identifier that uniquely identifies the housing 60, the number of cards in the housing, the type of cards in the housing 60, security keys, and the like. The crypto chip/processor can process data from the chip 140. The chip 140 can employ public key infrastructure (PKI) in the validation or authentication process.

Although the card mechanisms 12 have been described above as being card hoppers, in particular card feed hoppers, the card mechanisms 12 can be configured to perform other functions. For example, one or more of the card mechanisms 12 can be configured as card output hoppers. In addition, one or more of the card mechanisms 12 can be configured to perform one or more specific processing operations on a card that is introduced into the card mechanism 12. For example, the card mechanism 12 can be configured to program and/or validate a chip on a card, program and/or validate a magnetic stripe on a card, apply a laminate to a surface of a card, emboss or indent characters on a card, print on a card, perform a verification process on a card, and other processing operations.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A card mechanism array, comprising:
a plurality of card mechanisms arranged into an array having at least one row, the card mechanisms include at least one card hopper that is configured to contain a plurality of cards in a stack and at least one card personalization mechanism;
each card mechanism has an access end; the access end is configured to permit a card to exit and/or enter the respective card mechanism through the access end; and
a movable card handling mechanism adjacent to the access ends.

2. The card mechanism array of claim 1, wherein the array comprises a plurality of rows and columns.

3. The card mechanism array of claim 1, wherein the movable card handling mechanism is pivotable about a pivot axis that is perpendicular to longitudinal axes of the card mechanisms, and the movable card handling mechanism is movable linearly in the direction of the pivot axis.

4. The card mechanism array of claim 1, wherein the card mechanisms include a plurality of the card hoppers.

5. The card mechanism array of claim 1, wherein the card mechanisms include a plurality of the card personalization mechanisms.

6. The card mechanism array of claim 1, wherein the at least one card personalization mechanism programs a chip on a card or reads data from and/or writes data to a magnetic stripe on a card.

7. The card mechanism array of claim 1, wherein the movable card handling mechanism includes a microprocessor disposed thereon that controls operation of the movable card handling mechanism.

8. A desktop card printer, comprising:
a housing with a card input and a card output;
a print mechanism within the housing that can perform a printing operation on a card; and
the card mechanism array of claim 1 connected to the housing.

9. A card mechanism array, comprising:
a plurality of card mechanisms arranged into an array having at least one row, the card mechanisms include at least one card hopper that is configured to contain a plurality of cards in a stack and at least one card personalization mechanism;
each card mechanism has an access end; the access end is configured to permit a card to exit and/or enter the respective card mechanism through the access end; and
each card mechanism has a longitudinal axis, and the longitudinal axes of the card mechanisms in the at least one row are arranged at an angle to one another so that the longitudinal axes will intersect one another on the access end sides of the card mechanisms.

10. The card mechanism array of claim 9, wherein the angles between the longitudinal axes of the card mechanisms in the at least one row are the same.

11. A card mechanism array, comprising:
a plurality of card mechanisms arranged into an array having at least one row, the card mechanisms include at least one card hopper that is configured to contain a plurality of cards in a stack and at least one card personalization mechanism;
each card mechanism has an access end; the access end is configured to permit a card to exit and/or enter the respective card mechanism through the access end; and
the at least one card hopper is a card feed hopper, and the card mechanisms include at least one card output hopper that is configured to contain a plurality of cards in a stack.

12. A card hopper array, comprising:
a plurality of card feed hoppers arranged into an array having at least one row; each card feed hopper is configured to contain a plurality of cards in a stack and is configured to discharge the cards individually one-by-one through an access end; each card feed hopper has a longitudinal axis; and the longitudinal axes of the card feed hoppers in the array are arranged at an angle to one another so that the longitudinal axes will intersect one another on the access end sides of the plurality of card feed hoppers.

13. The card hopper array of claim 12, further comprising at least three of the card feed hoppers in the at least one row.

14. The card hopper array of claim 12, wherein the array has a plurality of rows and columns of the card feed hoppers.

15. The card hopper array of claim 12, further comprising a movable card handling mechanism adjacent to the access ends.

16. The card hopper array of claim 15, wherein the movable card handling mechanism is pivotable about a pivot axis that is perpendicular to the longitudinal axes, and the movable card handling mechanism is movable linearly in the direction of the pivot axis.

17. The card hopper array of claim 12, wherein the angles between the longitudinal axes of the card feed hoppers in the at least one row are the same.

18. The card hopper array of claim 12, further comprising at least one card output hopper adjacent to the card feed hoppers, the at least one card output hopper includes an access end through which a card can be inserted into the at least one card output hopper; and the access end of the at least one card output hopper faces in the same direction as the access ends of the plurality of card feed hoppers.

19. A desktop card printer, comprising:
a housing with a card input and a card output;
a print mechanism within the housing that can perform a printing operation on a card; and
the card hopper array of claim 12 connected to the housing.

20. A card hopper system, comprising:
a plurality of card hoppers arranged into an array having at least one row; each card hopper is configured to contain a plurality of cards in a stack; each card hopper has an access end through which cards can be individually discharged one-by-one from or inserted one-by-one into the respective card hopper; and each card hopper has a longitudinal axis;
a movable card handling mechanism adjacent to the access ends; and
the movable card handling mechanism is pivotable about a pivot axis that is perpendicular to the longitudinal axes, and the movable card handling mechanism is movable linearly in the direction of the pivot axis.

21. The card hopper system of claim 20, further comprising at least three of the card hoppers in the at least one row.

22. The card hopper system of claim 20, wherein the array has a plurality of rows and columns of the card hoppers.

23. The card hopper system of claim 22, wherein the array has a plurality of card feed hoppers each of which is configured to contain a plurality of cards in a stack and at least one card output hopper.

24. A desktop card printer, comprising:
a housing with a card input and a card output;
a print mechanism within the housing that can perform a printing operation on a card; and
the card hopper system of claim 20 connected to the housing.

* * * * *